(12) United States Patent
Wakino

(10) Patent No.: US 6,491,541 B2
(45) Date of Patent: Dec. 10, 2002

(54) USB CABLE FIXTURE FOR PREVENTING USB CONNECTOR FROM BEING UNPLUGGED

(75) Inventor: Jun Wakino, Gunma (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/851,301

(22) Filed: May 8, 2001

(65) Prior Publication Data

US 2001/0053626 A1 Dec. 20, 2001

(30) Foreign Application Priority Data

May 15, 2000 (JP) .................................... 2000-142426

(51) Int. Cl.[7] .............................................. H01R 13/58
(52) U.S. Cl. ....................................... 439/451; 439/373
(58) Field of Search .................................. 439/451, 369, 439/371, 373, 828, 456, 457, 458, 459, 470, 471, 472, 528; 248/73, 74.1, 2, 3, 68; 174/65 R, 65 SS

(56) References Cited

U.S. PATENT DOCUMENTS

| | | | | |
|---|---|---|---|---|
| 2,084,953 A | * | 6/1937 | Gibson | 247/23 |
| 5,006,960 A | * | 4/1991 | Kallin et al. | 361/390 |
| 6,083,038 A | * | 7/2000 | Wright et al. | 439/473 |
| 6,161,804 A | * | 12/2000 | Paske | 248/74.1 |
| 6,213,808 B1 | * | 4/2001 | Whatmore et al. | 439/417 |
| 6,220,554 B1 | * | 4/2001 | Daoud | 248/74.1 |

FOREIGN PATENT DOCUMENTS

JP 11-329574 11/1999

* cited by examiner

*Primary Examiner*—Tho D. Ta
*Assistant Examiner*—Alexander Gilman
(74) *Attorney, Agent, or Firm*—Dickstein, Shapiro, Morin & Oshinsky, LLP.

(57) ABSTRACT

A USB cable fixture for fixing a USB cable with a USB connector to a computer is composed of a base portion, an attaching portion, and a fastening portion. The attaching portion extends from the base portion in a first direction and is attached to a housing of the computer. The fastening portion extends in a second direction orthogonal to the first direction on an opposite side of the base portion to the attaching portion. The USB cable is fixed to the computer by the base portion, the fastening portion, and the USB connector.

18 Claims, 7 Drawing Sheets

USB CABLE FIXTURE FOR PREVENTING USB CONNECTOR FROM BEING UNPLUGGED

BACKGROUND OF THE INVENTION

1. Field of the Invention

The present invention relates to a USB (Universal Serial Bus) cable fixture. In particular, the present invention relates to a USB cable fixture for preventing a USB connector from being detached or unplugged.

2. Description of the Related Art

A USB cable is used to electrically connect a computer and other apparatuses. For example, input devices such as a mouse and a keyboard are connected through the USB cable to the computer.

A USB connector is disposed at an end of the USB cable. The USB connector is inserted into a mount port disposed on a computer. When the USB connector is inserted into the mount port, a fastening claw in the USB connector is fastened to a fasten protrusion formed in the mount port, then the USB connector is fastened to the computer.

However, if force is accidentally applied to the USB cable, the USB connector may be detached from the computer. One of the reasons lies in the small size of the USB connector. The small size of the USB connector imposes the limitation on the size of the fastening claw. Accordingly, the fastening strength between the fastening claw and the fastening protrusion becomes inevitably weak.

FIGS. 1 and 2 show a conventional technique for protecting the USB connector from being detached. As shown in FIG. 2, a mount port 104 is disposed in a side 103a of the computer 103. A USB connector 102, which is connected to a tip of a USB cable 101, is inserted into the mount port 104. A USB cable fixture 105 having substantially horizontal U-shape is attached to the side 103a, as shown in FIG. 2. The USB cable fixture 105 is screwed to the side 103a. A rectangular space is created between the USB cable fixture 105 and the body of the computer 103. The space is penetrated by the USB cable 101. When force is applied to the USB cable 101, the USB cable 101 is supported by the USB cable fixture 105. The force is not directly supplied to the USB connector 102. It is possible to protect the USB connector 102 from being detached.

Also, a connector having a mechanism for supporting an electric wire is disclosed in Japanese Laid Open Patent Application (JP-A-Heisei, 11-329574). As shown in FIG. 3, the conventional connector has a connector housing 201. Electric wires W are connected to terminals (not shown) in the connector housing 201. The electric wires W are bound by a clamp 211. The clamp 211 is connected to an electric wire supporter H1. An attachment groove 205 is disposed in the connector housing 201.

As shown in FIG. 4, the electric wire supporter H1 is inserted into the attachment groove 205 and fixed therein. Even if the electric wire W is pulled, the tensile force is not directly applied to the terminals in the connector housing 201.

However, the conventional connector is not the USB connector. Furthermore, the suggestible fact that the conventional connector can be used as the USB connector is not noted in Japanese Laid Open Patent Application (JP-A-Heisei, 11-329574).

SUMMARY OF THE INVENTION

An object of the present invention is to provide an improved USB cable fixture.

Another object of the present invention is to provide a USB cable fixture that can be easily attached and detached.

In order to achieve an aspect of the present invention, a USB cable fixture for fixing a USB cable with a USB connector to a computer is composed of a base portion, an attaching portion, and a fastening portion. The attaching portion extends from the base portion in a first direction and is attached to a housing of the computer. The fastening portion extends in a second direction orthogonal to the first direction on an opposite side of the base portion to the attaching portion. The USB cable is fixed to the computer by the base portion, the fastening portion, and the USB connector.

The base portion may have a surface facing the housing. In this case, the attaching portion desirably includes first and second fastening legs, and first and second engaging portion. The first and second fastening legs are elastically deformable, and extend from the facing surface in the first direction. The first engaging portion is provided at a first tip portion of the first fastening leg to engage with a first engaging hole of the housing. The second engaging portion is provided at a second tip portion of the second fastening leg to engage with an second engaging hole of the housing.

Elastic constants of the first and second fastening legs are desirably determined such that the attaching portion is detached from the housing when force having a predetermined strength is applied to the USB cable.

A first height of the first engaging portion from the first fastening leg in a third direction orthogonal to the first direction and a second height of the second engaging portion from the first fastening leg in the third direction are desirably determined such that the attaching portion is detached from the housing when force having a predetermined strength is applied to the USB cable.

In order to achieve another aspect of the present invention, a computer system is composed of a computer including a housing, a USB connector connected to the computer, a USB cable connected to the USB connector and a USB cable fixture attached to the housing. The USB cable fixture includes a base portion, an attaching portion, a fastening portion. The attaching portion extends from the base portion in a first direction and is attached to the housing. The fastening portion extends in a second direction orthogonal to the first direction on an opposite side of the base portion to the attaching portion. The USB cable is fixed to the computer by the base portion, the fastening portion, and the USB connector.

In order to achieve still another aspect of the present invention, a method of fixing a USB cable connected to a USB connector is composed of:

connecting the USB connector to a computer; and attaching a USB cable fixture to a housing of the computer to enclose the USB cable by the USB cable fixture, the housing, and the USB connector.

The attaching may include engaging a first engaging portion provided on the USB cable fixture to a second engaging portion provided on the housing.

DESCRIPTION OF THE PREFERRED EMBODIMENTS

An embodiment of the present invention will be described below with reference to the attached drawings.

Figure 1:
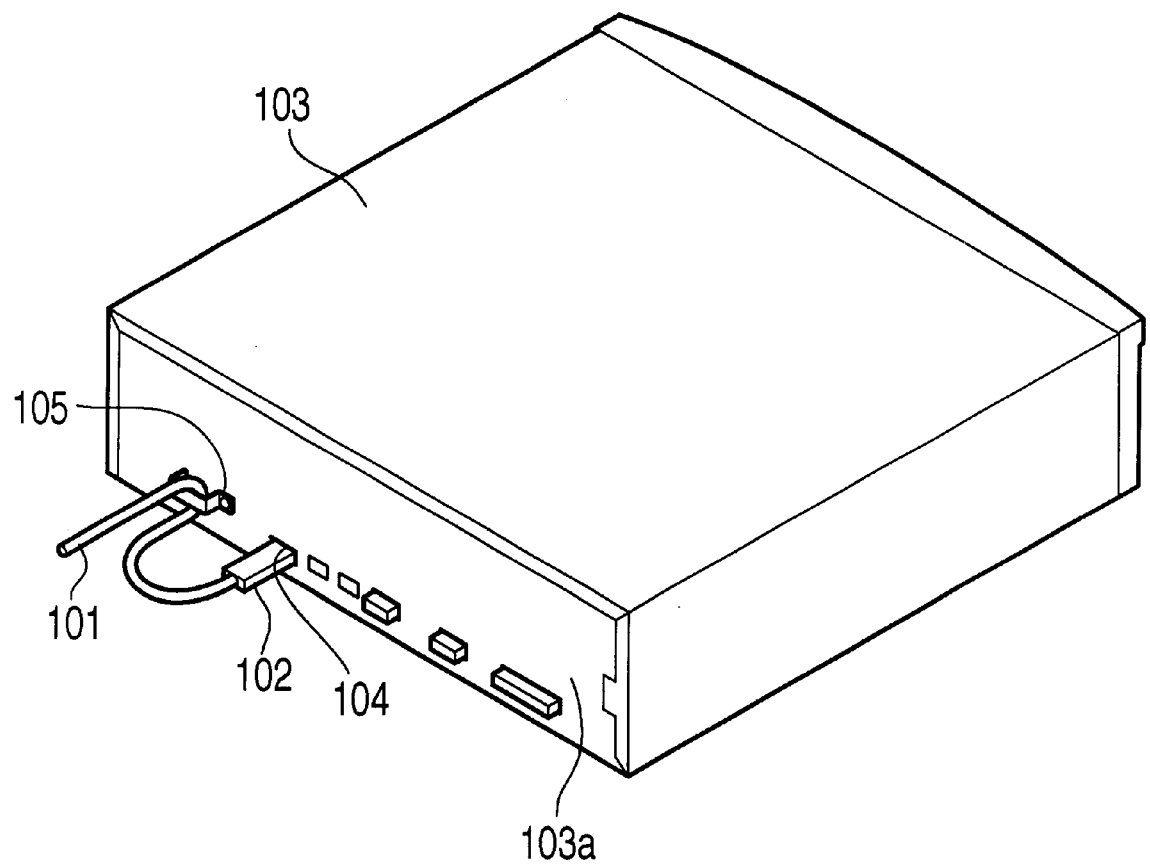
FIG. 1 shows a conventional technique for preventing a USB connector from being detached.
Figure 2:
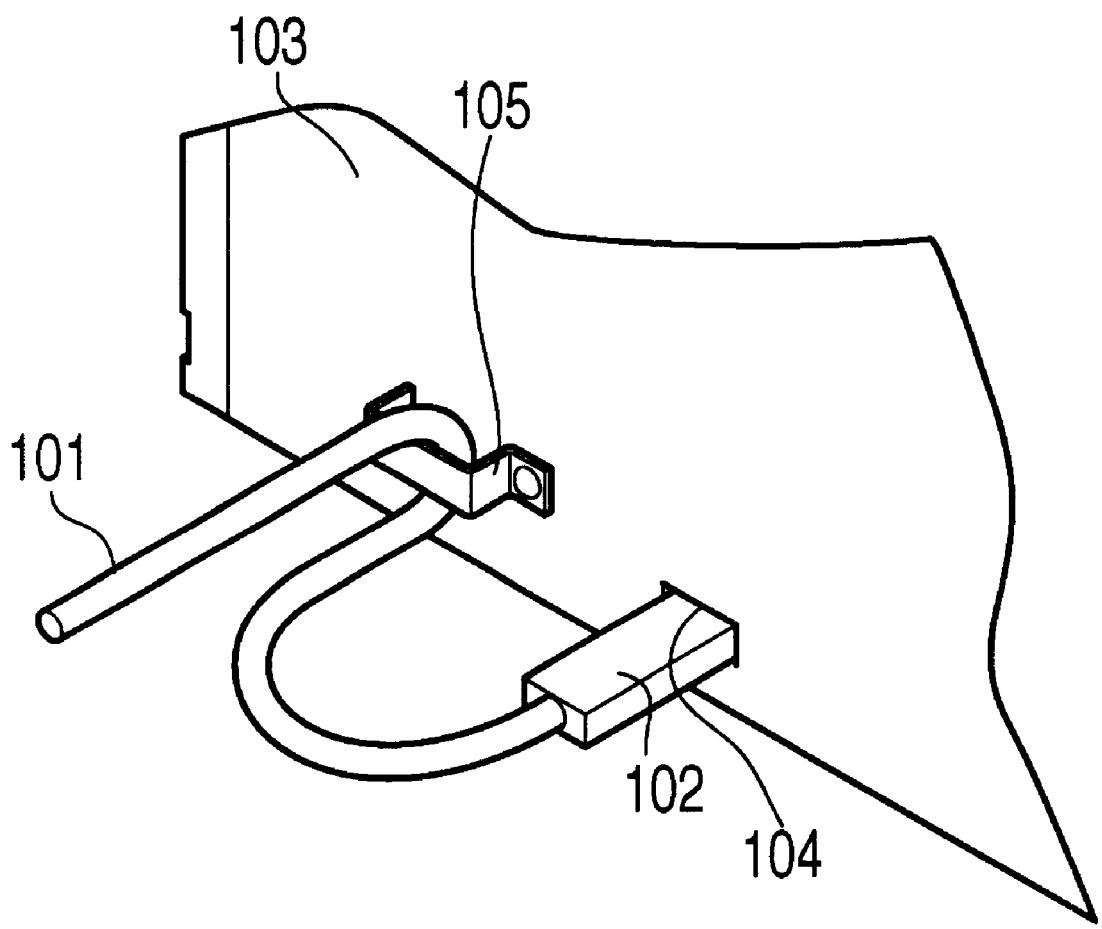
FIG. 2 shows a conventional USB cable fixture 105.
Figure 3:
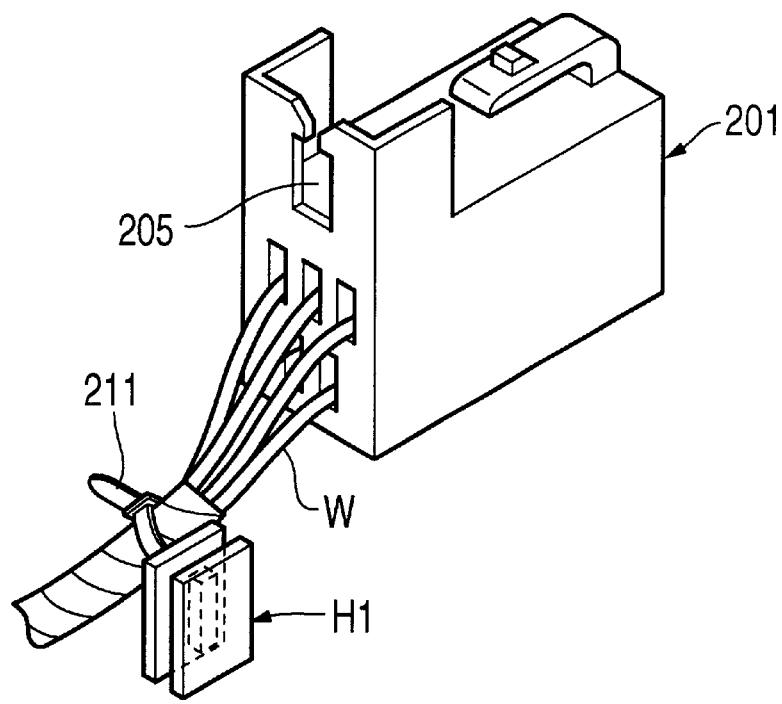
FIG. 3 shows a conventional connector.
Figure 4:
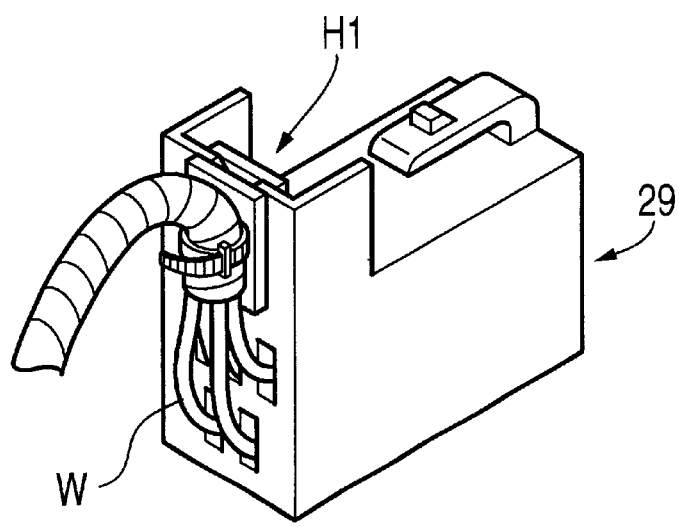
FIG. 4 shows a method of using the conventional connector.
Figure 5:
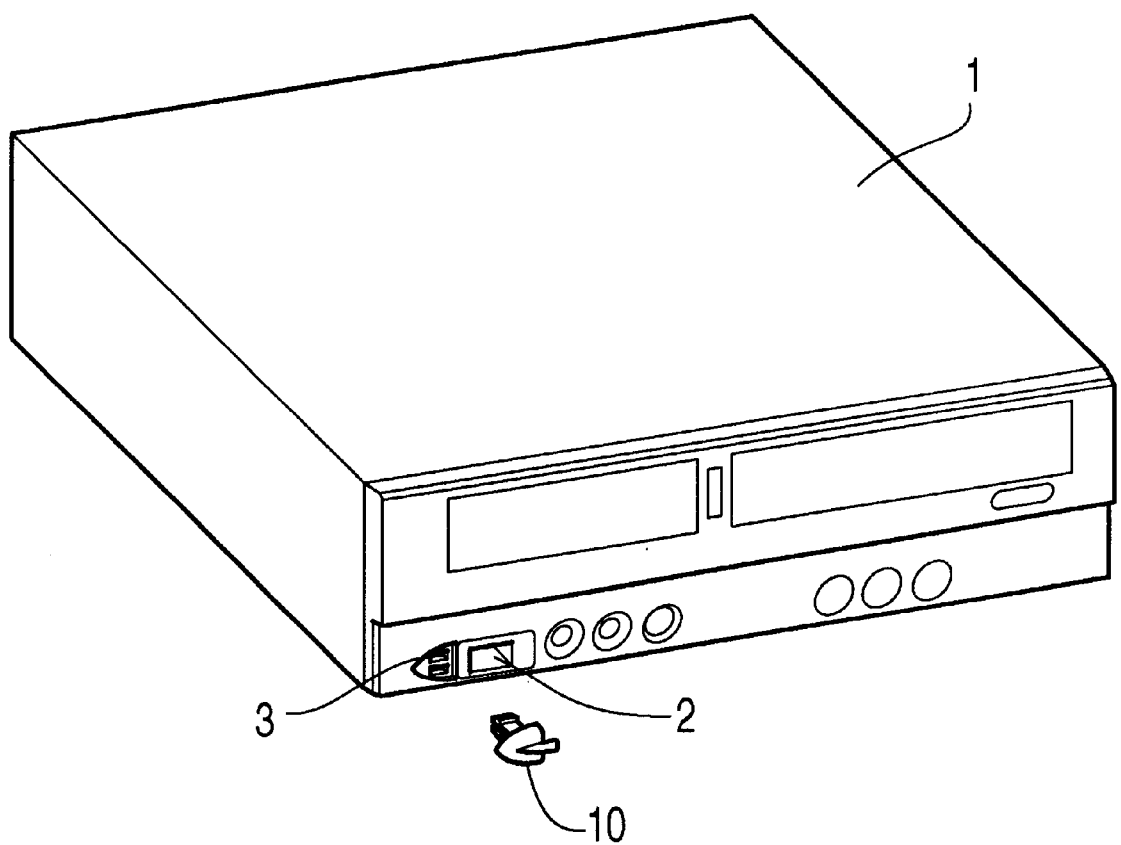
FIG. 5 shows a computer into which a USB cable fixture of an embodiment according to the present invention is inserted.

As shown in FIG. 5, a USB cable fixture 10 of the present embodiment is attached to a computer 1. The computer 1 includes a housing 1a. A mount port 2 for USB connector and a fastening hole 3 for the USB cable fixture 10 are disposed on the housing 1a. A USB cable fixture 10 of the present embodiment is attached to the housing 1a.

Figure 6:
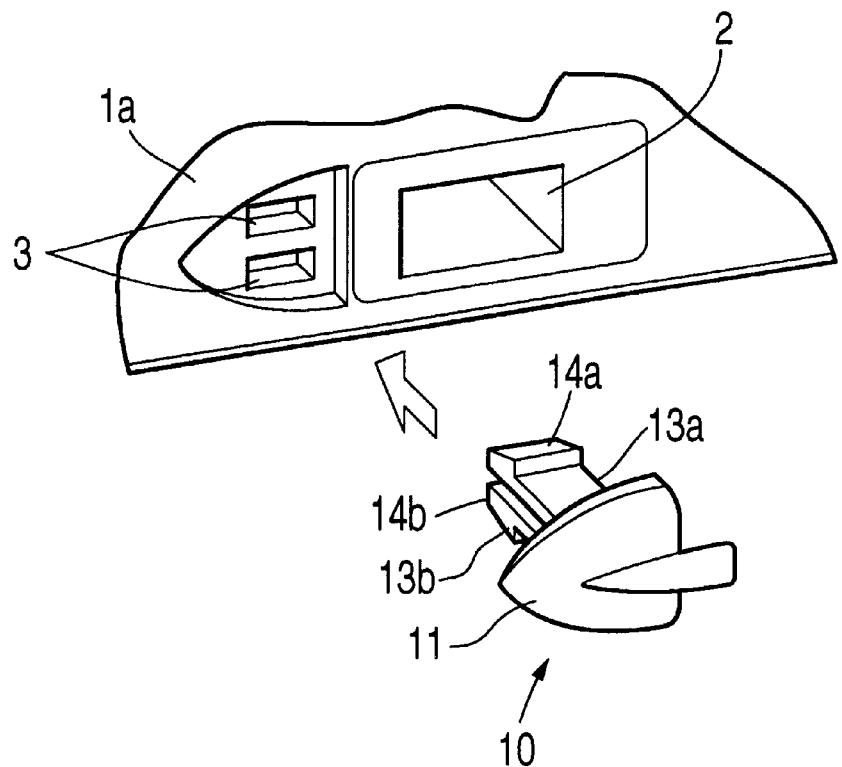
FIG. 6 shows a USB cable fixture 10 of the embodiment according to the present invention.
Figure 7:
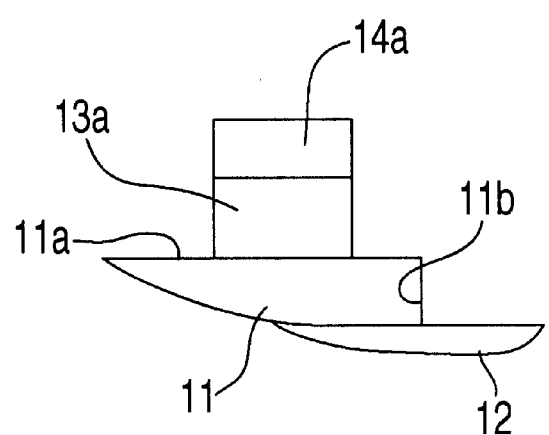
FIG. 7 is a top view of the USB cable fixture 10.

FIG. 6 is an enlarged view of the USB cable fixture 10. The USB cable fixture 10 has a base 11. The base 11 has an facing surface 11a for facing to the housing 1a of the computer 1 and a support surface 11b substantially vertical to the facing surface 11a, as shown in FIG. 7. A fastening piece 12 extending in a direction vertical to the support surface 11b is disposed in the base 11 on the opposite side of the facing surface 11a. A pair of fastening legs 13a and 13b are disposed on the facing surface 11a of the base 11. The fastening legs 13a, 13b are protruded in the direction vertical to the facing surface 11a. The fastening legs 13a, 13b can be elastically deformed. As shown in FIG. 6, fastening protrusions 14a, 14b are disposed at the tips of the fastening legs 13a, 13b, respectively. The fastening protrusion 14a and the fastening protrusion 14b are respectively protruded from the fastening legs 13a, 13b, towards the sides opposite to each other.

Figure 8:
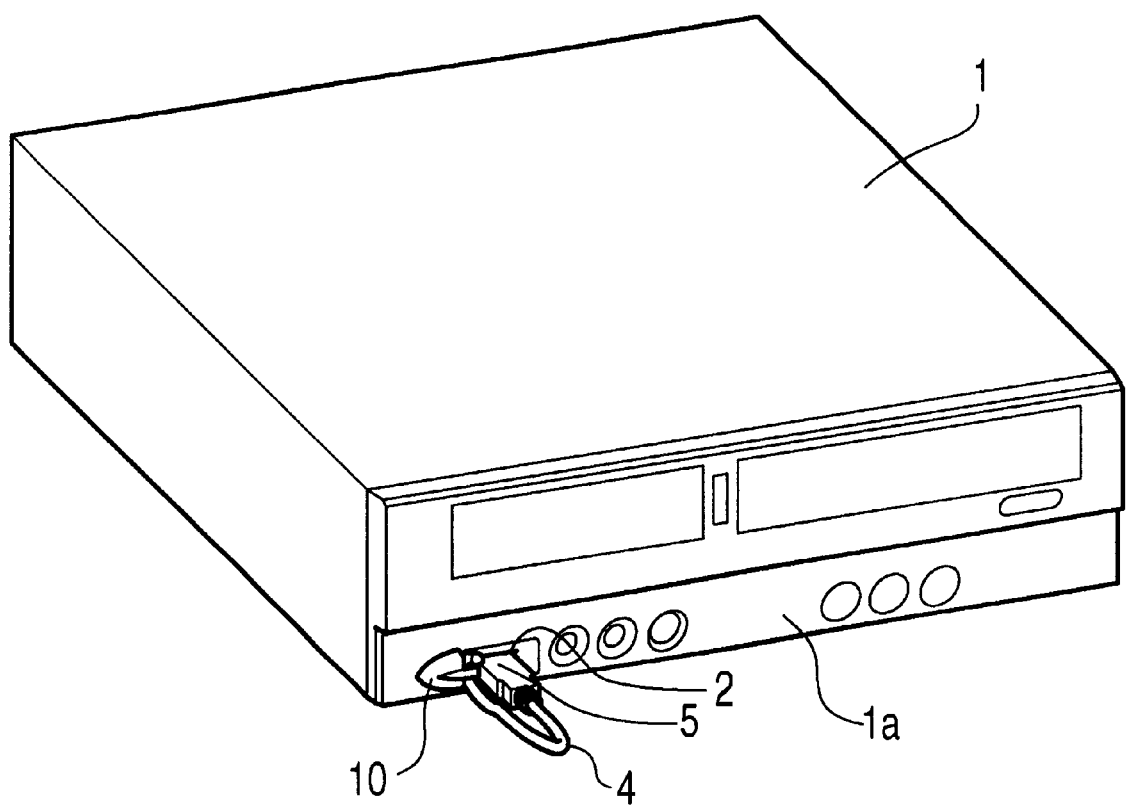
FIG. 8 shows a method of using the USB cable fixture 10.
Figure 9:
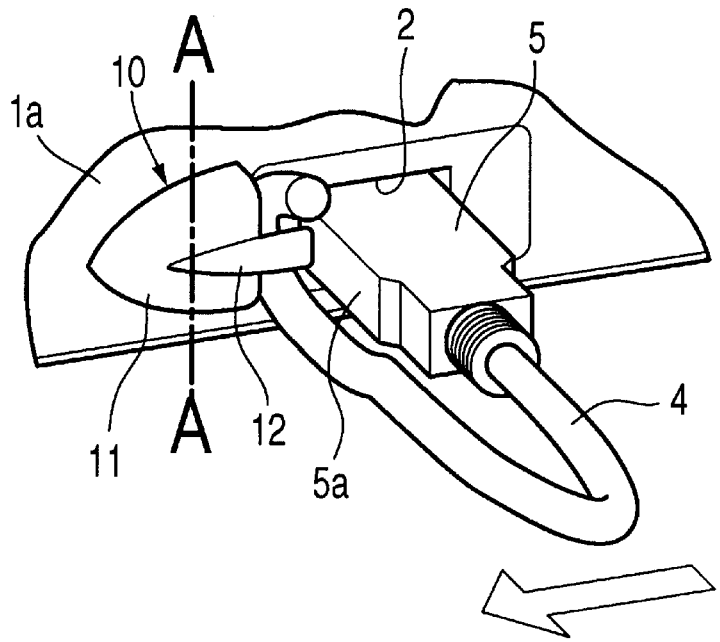
FIG. 9 shows a method of using the USB cable fixture 10.
Figure 10:
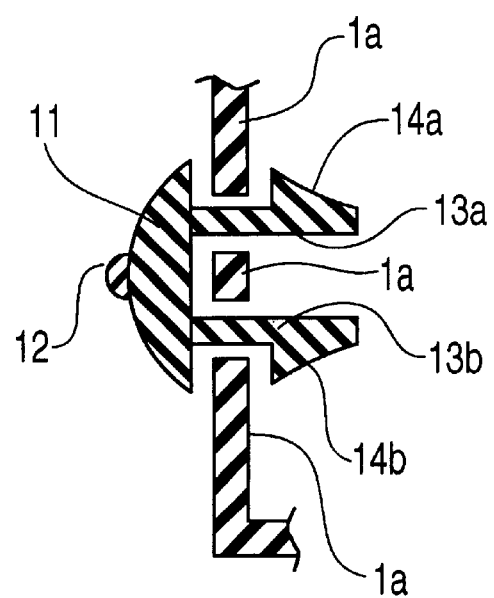
FIG. 10 shows a method of using the USB cable fixture 10.

FIGS. 8 to 10 show the method of using the USB cable fixture 10. As shown in FIG. 8, a USB connector 5, which is connected to a USB cable 4, is inserted into and fixed to the mount port 2. As shown in FIG. 9, the USB cable 4 is bent toward a side 5a of the USB connector 5 to be contacted with the side 5a.

The fastening legs 13a, 13b of the USB cable fixture 10 are inserted into the fastening holes 3. As shown in FIG. 10, the fastening protrusions 14a, 14b are engaged with the inner surface of the housing 1a of the computer 1. This engagement enables the USB cable fixture 10 to be coupled to the computer 1.

As shown in FIG. 9, the base 11, the fastening piece 12, the side 5a of a USB connector 5, and the housing 1a of the computer 1 substantially enclose the USB cable 4. The enclosed USB cable 4 is supported by the USB cable fixture 10. There may be a clearance between the fastening piece 12 and the side 5a of a USB connector 5. In this case, the clearance should be narrower than the diameter of the USB cable 4.

For detaching the USB cable fixture 10 from the housing 1a, the USB cable fixture 10 is pulled in a direction vertical to the housing 1a. Then, the fastening legs 13a and 13b are deformed to be close to each other and the USB cable fixture 10 is detached from the housing 1a.

When force is applied to the USB cable 13, the USB cable fixture 10 supports the USB cable 13. The force is not directly applied to the USB connector 5, and thereby the USB cable fixture 10 prevents the USB connector 5 from being detached.

The fastening strength between the USB cable fixture 10 and the housing 1a is desirably determined such that the USB cable fixture 10 is detached from the housing 1a when force applied to the USB cable 4 becomes equal to or greater than a predetermined value. Thus, it is possible to protect the USB cable 4 This prevents the USB cable 4 from being damaged when a strong force is applied to the USB cable 4. The fastening strength may be adjusted by the heights of the fastening protrusions 14a and 14b. Also, the fastening strength may be adjusted by the elastic coefficients of the fastening legs 13a and 13b.

The USB cable fixture 10 in this embodiment surrounds and supports the USB cable 4 with the base 11, the fastening piece 12, the side 5a of the USB connector 5, and the housing 1a of the computer 1. The force applied to the USB cable 4 is held by the USB cable fixture 10. Thus, the detachment of the USB connector 5 is prevented.

Moreover, the USB cable fixture 10 can be freely attached and detached. Thus, the handling of the USB cable fixture 10 is simple and easy.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A USB cable fixture for fixing a USB cable with a USB connector to a computer, comprising:

a base portion;

an attaching portion extending from said base portion in a first direction and attached to a housing of said computer;

a fastening portion extending in a second direction orthogonal to said first direction on an opposite side of said base portion to said attaching portion, wherein said USB cable is fixed to said computer at one point by said base portion, said fastening portion, and said USB connector.

2. The USB cable fixture according to claim 1, wherein said base portion has a surface facing said housing, and said attaching portion includes:

a first fastening leg elastically deformable and extending from said facing surface in said first direction, a first engaging portion provided at a first tip portion of said first fastening leg to engage with a first engaging hole of said housing, a second fastening leg elastically deformable and extending from said facing surface in said first direction, a second engaging portion provided at a second tip portion of said second fastening leg to engage with an second engaging hole of said housing.

3. The USB cable fixture according to claim 2, wherein elastic constants of said first and second fastening legs are determined such that said attaching portion is detached from said housing when force having a predetermined strength is applied to said USB cable.

4. The USB cable fixture according to claim 2, wherein a first height of said first engaging portion from said first fastening leg in a third direction orthogonal to said first direction and a second height of said second engaging portion from said first fastening leg in said third direction are determined such that said attaching portion is detached from said housing when force having a predetermined strength is applied to said USB cable.

5. A computer system comprising:
   a computer including a housing;
   a USB connector connected to said computer;
   a USB cable connected to said USB connector; and
   a USB cable fixture attached to said housing, wherein said USB cable fixture includes:
      a base portion;
      an attaching portion extending from said base portion in a first direction and attached to said housing;
      a fastening portion extending in a second direction orthogonal to said first direction on an opposite side of said base portion to said attaching portion, wherein said USB cable is fixed to said computer at one point by said base portion, said fastening portion, and said USB connector.

6. The computer system according to claim 5, wherein said base portion has a surface facing said housing, and said attaching portion includes:
   a first fastening leg elastically deformable and extending from said facing surface in said first direction,
   a first engaging portion provided at a first tip portion of said first fastening leg to engage with a first engaging hole of said housing,
   a second fastening leg elastically deformable and extending from said facing surface in said first direction,
   a second engaging portion provided at a second tip portion of said second fastening leg to engage with an second engaging hole of said housing.

7. The computer system according to claim 5, wherein elastic constants of said first and second fastening legs are determined such that said attaching portion is detached from said housing when force having a predetermined strength is applied to said USB cable.

8. The computer system according to claim 5, wherein a first height of said first engaging portion from said first fastening leg in a third direction orthogonal to said first direction and a second height of said second engaging portion from said first fastening leg in said third direction are determined such that said attaching portion is detached from said housing when force having a predetermined strength is applied to said USB cable.

9. A method of fixing a USB cable connected to a USB connector comprising:
   connecting said USB connector to a computer; and
   attaching a USB cable fixture to a housing of said computer to enclose said USB cable at one point by said USB cable fixture, said housing, and said USB connector.

10. The method according to claim 9, wherein said attaching includes engaging a first engaging portion provided on said USB cable fixture to a second engaging portion provided on said housing.

11. A USB cable fixture for securing a USB cable having a USB connector to a computer housing, the USB cable fixture comprising:
    a base portion;
    an attaching portion extending from the base portion in a first direction;
    a fastening portion extending from the base portion in a second direction such that the base portion, the fastening portion, the USB connector and the computer housing align to form an enclosure which secures the USB cable to the computer housing at one point.

12. The USB cable fixture according to claim 11, wherein the attaching portion includes a first fastening leg and a second fastening leg.

13. The USB cable fixture according to claim 12, wherein the first fastening leg includes a first engaging portion at an end thereof and the second fastening leg includes a second engaging portion at an end thereof.

14. The USB cable fixture according to claim 11, wherein the cable fixture is detachable from the computer housing at a predetermined force.

15. A computer system comprising:
    a computer including a housing;
    a USB connector connected to the computer;
    a USB cable connected to the USB connector; and
    a USB cable fixture attached to the housing, wherein the USB cable fixture includes:
       a base portion;
       an attaching portion extending from the base portion in a first direction; and
       a fastening portion extending from the base portion in a second direction such that the base portion, the fastening portion, the USB connector and the housing form an enclosure which secures the USB cable to the housing at one point.

16. The computer system according to claim 15, wherein the attaching portion includes a first fastening leg and a second fastening leg.

17. The computer system according to claim 16, wherein the first fastening leg includes a first engaging portion at an end thereof and the second fastening leg includes a second engaging portion at an end thereof.

18. The computer system according to claim 15, wherein the cable fixture is detachable from the computer housing at a predetermined force.

\* \* \* \* \*